(12) United States Patent
Tabata et al.

(10) Patent No.: US 7,438,485 B2
(45) Date of Patent: Oct. 21, 2008

(54) OPTICAL FIBER FUSION SPLICER AND OPTICAL FIBER LOADING DEVICE

(75) Inventors: Manabu Tabata, Sakura (JP); Kenji Takahashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/148,378

(22) Filed: Jun. 9, 2005

(65) Prior Publication Data
US 2005/0276549 A1    Dec. 15, 2005

(30) Foreign Application Priority Data
Jun. 10, 2004    (JP) .............................. P2004-172728

(51) Int. Cl.
*G02B 6/25* (2006.01)
*G02B 6/255* (2006.01)
(52) U.S. Cl. .............................. 385/97; 385/96; 385/134
(58) Field of Classification Search ............. 385/96–98, 385/134
See application file for complete search history.

(56) References Cited

U.S. PATENT DOCUMENTS

| 6,099,684 | A * | 8/2000 | Dannoux ..................... 156/293 |
| 6,668,128 | B2 * | 12/2003 | Hattori et al. ............... 385/136 |
| 6,819,858 | B2 * | 11/2004 | Steinberg et al. ............ 385/137 |

FOREIGN PATENT DOCUMENTS

| JP | H07-043453 B2 | 5/1995 |
| JP | 2003-029078 A | 1/2003 |
| JP | 2003-315598 A | 11/2003 |

* cited by examiner

*Primary Examiner*—Jerry T Rahll
(74) *Attorney, Agent, or Firm*—Sughrue Mion, PLLC (57) ABSTRACT

An optical fiber loading device includes a loading stage, which includes a first clamp block, fitted in a first opening defined in a first base portion, including first grooves adapted to position first optical fibers of a first optical fiber cable; and a first clamp arranged to releasably contact the first clamp block to clamp the first optical fibers therebetween, wherein the first clamp block and first base portion are formed of two different materials. The device also includes a first holder adapted to hold the first optical fiber cable, and to move the first optical fiber relative to the loading stage to bring the first optical fibers in contact with second optical fibers of a second optical fiber cable.

10 Claims, 7 Drawing Sheets

OPTICAL FIBER FUSION SPLICER AND OPTICAL FIBER LOADING DEVICE

CROSS-REFERENCE TO RELATED APPLICATIONS

This application is based upon and claims the benefit of priority from Japanese Patent Application No. 2004-172728, filed on Jun. 10, 2004 in the Japanese Patent Office, the entire contents of which are incorporated herein by reference.

BACKGROUND OF THE INVENTION

The invention relates to an optical fiber fusion splicer and an optical fiber loading device thereof, which provides highly precise alignment positioning of end faces of optical fibers, of optical fiber cables, to each other to be brought in contact for fusion splicing.

Fusion splicing end faces of optical fibers of optical fiber cables to each other requires highly precise alignment positioning. Thus, a fusion splicer requires a V-groove block with a highly precisely machined V-groove. Positioning of the optical fibers of the optical fiber cables by the fusion splicer requires: (1) wear resistance; (2) heat resistance; (3) a small linear expansion coefficient; and (4) electric insulation.

A related fusion splicer is disclosed in Japanese Examined Patent Application No. H07-43453. This fusion splicer includes a standing body frame for fusion splicing. The fusion splicer has, at the left and right portions of the body frame for fusion splicing, for example, leftward and rightward movable left and right fiber holders. The left and right holders have a lower left fiber holder and a lower right holder; and an upper left holder and an upper right holder, respectively. The upper left holder and the upper right holder are vertically movable relative to the lower left fiber holder and the lower right holder using, for example, a hinge pin. The lower left holder and the lower right holder have surfaces that each has, for example, upward open rectangular grooves for holding, for example, an optical fiber ribbon cord with four optical fibers.

The body frame for fusion splice inside the left fiber holder and the right fiber holder has a loading device located thereof. The loading device includes, for example, a resinous loading body frame on the body frame for fusion splice. The loading body frame has a recessed shape as viewed from front, with a recessed portion at the substantially central portion between the left and right and between the front and rear of the body frame. The recessed portion has, at the front and rear, holes communicating with the recessed portion. The loading body frame includes, thereon, a ceramic block identical in shape with a lower clamp, as viewed from top. The ceramic block has a recessed portion; and identically shaped holes positioned in coincidence with the hole. The loading body frame has, thereon, a ceramic block integrally adhered thereto using an adhesive.

Ceramic block portions opposed to each other relative to the recessed portion in a left and right direction have surfaces with V grooves extended in the left and right direction. For clamping optical fibers exposed by removing sheaths from optical fiber ribbon cords, upper clamps are provided to be vertically movable relative to the ceramic blocks.

The related fusion splicer has the following problems: (1) the ceramic block has a large size and expensive production costs; (2) the ceramic block has complicated machining and expensive production costs; and (3) poor adhesion causes the ceramic block to be separated form the body frame, thus putting the fusion splicer out of use.

BRIEF SUMMARY OF THE INVENTION

In a first aspect of the invention, an optical fiber loading device is provided, including: a loading stage, comprising: a first clamp block, fitted in a first opening defined in a first base portion, comprising first grooves adapted to position first optical fibers of a first optical fiber cable; and a first clamp arranged to releasably contact the first clamp block to clamp the first optical fibers therebetween, wherein the first clamp block and first base portion are formed of two different materials; and a first holder adapted to hold the first optical fiber cable, and to move the first optical fiber relative to the loading stage to bring the first optical fibers in contact with second optical fibers of a second optical fiber cable.

In another aspect of the invention, an optical fiber fusion splicer is provided, including, in addition to the loading stage, a first electrode configured to discharge between the first and second optical fibers to fusion splice the first and second optical fibers to each other.

In another aspect of the invention, the loading stage further comprises: a second clamp block, fitted in a second opening defined in a second base portion, comprising second grooves adapted to position the second optical fibers of the second optical fiber cable; and a second clamp arranged to releaseably contact the second clamp block to clamp the second optical fibers therebetween, wherein the second clamp block and second base portion are formed of two different materials.

In other aspects of the invention, the first clamp block is formed of a material more brittle that the material of which the first base portion is formed, the first base portion is formed of a resinous material, and the first clamp block is formed of a ceramic material.

In another aspect of the invention, a method of insert molding a loading stage for an optical fiber is provided, including: fitting a first clamp block to a mold; and filling a resin into the mold having the first clamp block fitted thereto to form a first base portion around the first clamp block.

In another aspect of the invention, the first grooves in the first clamp block are formed after the first clamp block is insert molded to the first base portion.

In another aspect of the invention, the first grooves in the first clamp block are formed before the first clamp block is insert molded to the first base portion.

According to the aspects of the invention, the clamp blocks are not adhered to the loading stage as a conventional way, which eliminates the step of adhering the clamp block, thus reducing production costs. The aspects avoid peeling or separation of the clamp block from the loading stage, thus ensuring necessary precision.

The aspects allows for the clamp block smaller in size than conventional one, and achieves remarkable reduction in costs. In addition, the aspects simplify machining of the clamp block, thus reducing production costs.

BRIEF DESCRIPTION OF THE ACCOMPANYING DRAWINGS

The above and other objects, features and advantages of the invention will become more apparent by describing in detail exemplary embodiments thereof with reference to the attached drawings in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way.

Figure 1:
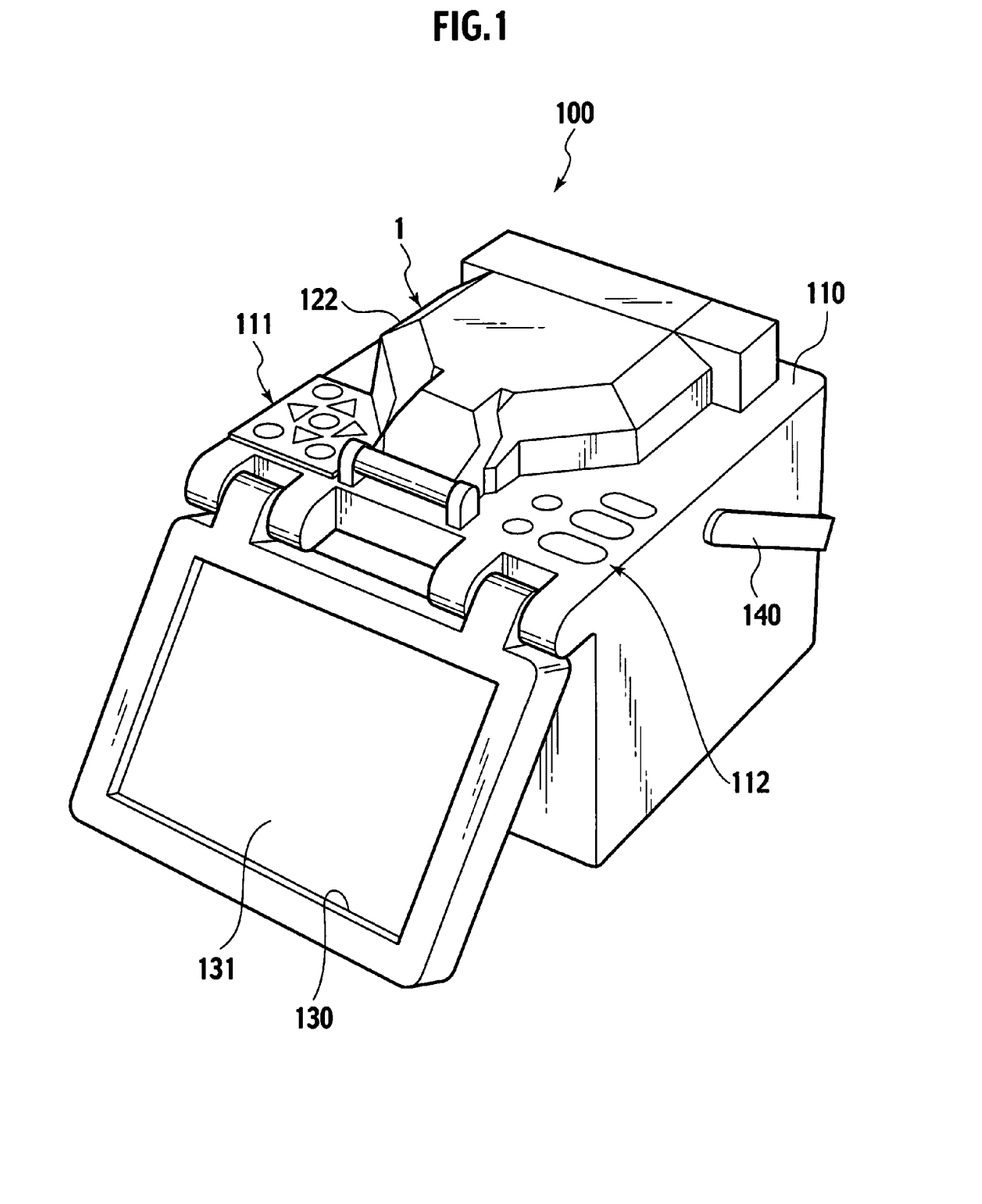
FIG. 1 is a perspective view of a fusion splicer according to the invention.
Figure 2:
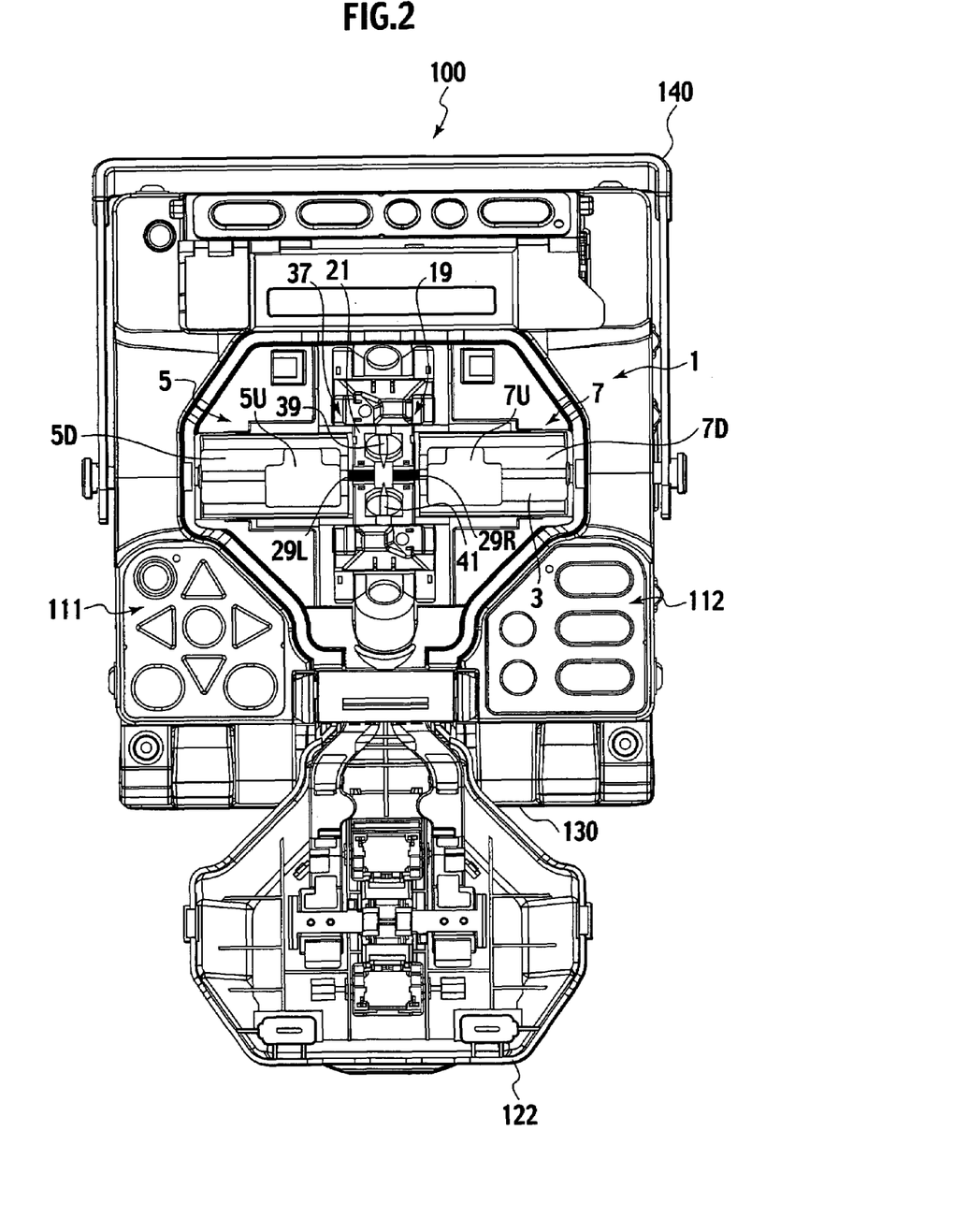
FIG. 2 is a plane view of the fusion splicer in FIG. 1, where the cover is open.

With reference to FIG. 1, an optical fiber fusion splicer 100 (referred to as a fusion splicer) includes, on the top of a casing 110, a fusion splicing system 1 covered with a cover 122. The fusion splicer 100 includes a monitor 130 rotatably supported to casing 110. The monitor 130 includes a display 131 to display process of fusion splicing optical fibers to each other. The fusion splicer 100 has groups of switches 111 and 112. The fusion splicer 100 includes a carrier handle 140 mounted on the casing 110.

Figure 3:
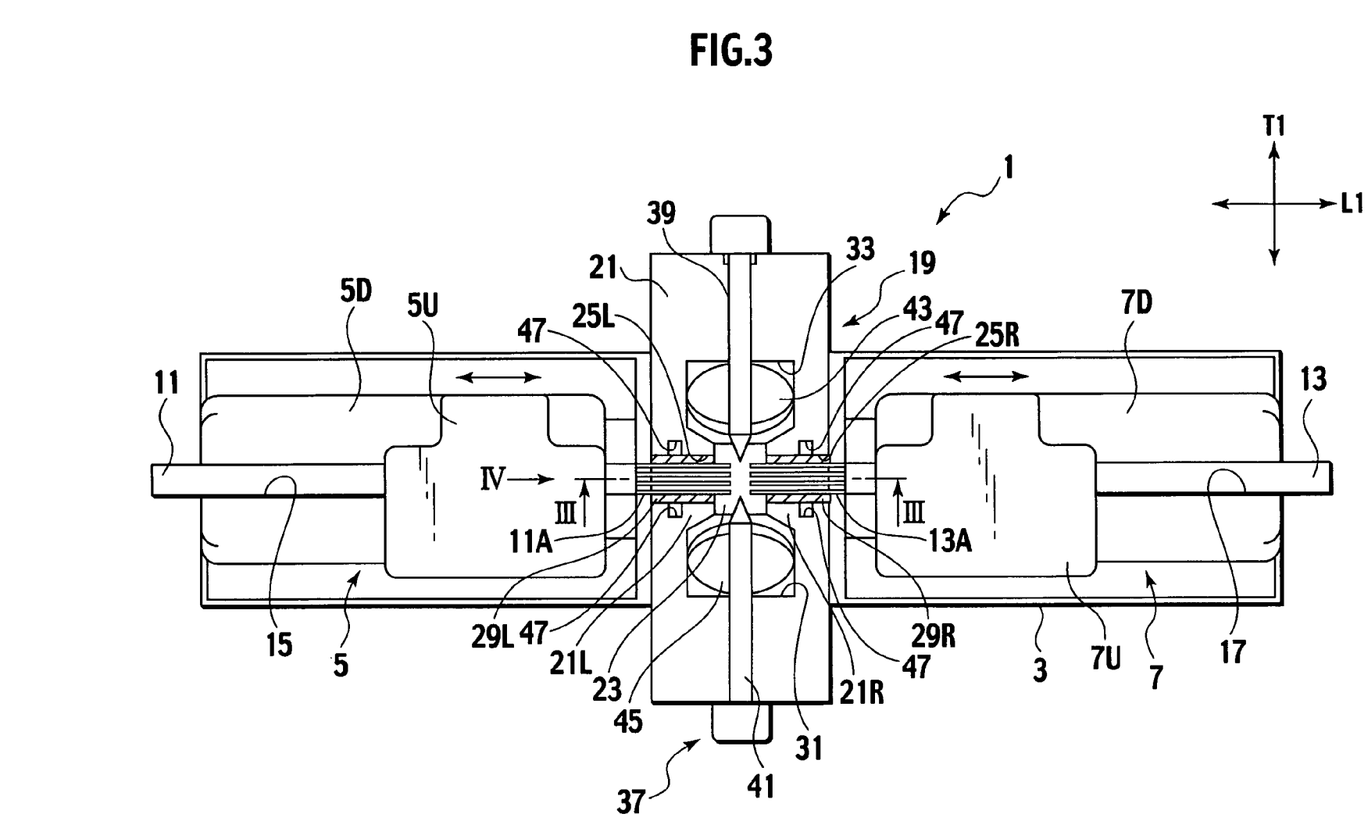
FIG. 3 is a plane view of the primary portion of the fusion splicer in FIG. 1.
Figure 4:
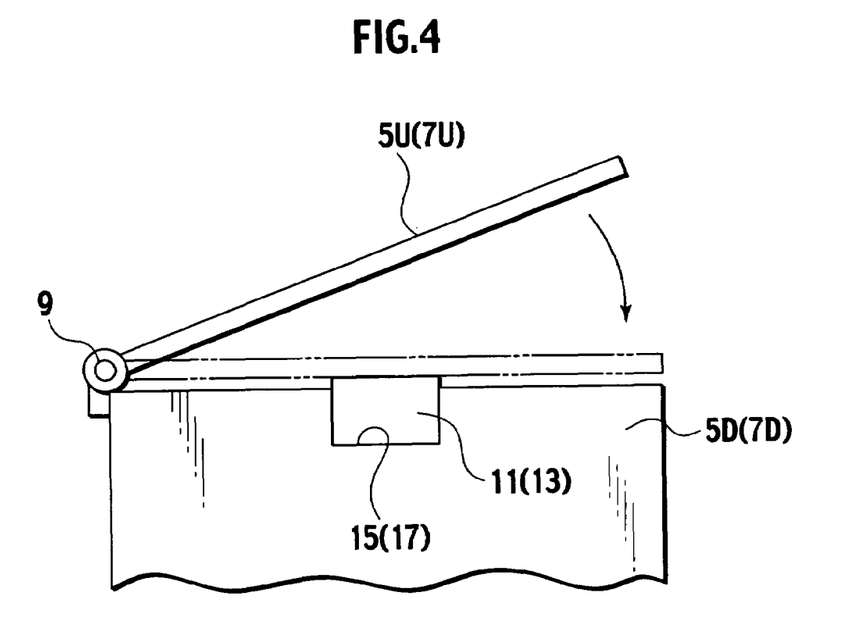
FIG. 4 is an enlarged partial left side view of a first optical fiber holder in FIG. 3.

With respect to FIG. 3, the fusion splicing system 1 includes a standing body frame 3 for fusion splice. The fusion splicing system 1 includes, at the left and right portions on the body frame 3, first and second fiber holders 5 and 7 movable, for example, in a left and right direction or a longitudinal direction L1. One of the first and second fiber holders 5 and 7 may be fixed, and the other one may be movable in the longitudinal direction L1. Additionally with respect to FIG. 4, the first and second fiber holders 5 and 7 include a first lower fiber holder 5D and a second lower fiber holder 7D; and a first upper fiber holder 5U and a second upper holder 7U, respectively. The first and second upper fiber holders 5U and 7U are vertically rotatable relative to the first and second lower fiber holders 5D and 7D using, for example, hinge pins 9. The first and second lower fiber holders 5D and 7D have surfaces defining, for example, upward open rectangular grooves 15 and 17 that hold optical fiber ribbon cords 11 and 13 with, for example, four optical fibers as optical fiber cables, respectively.

Figure 5:
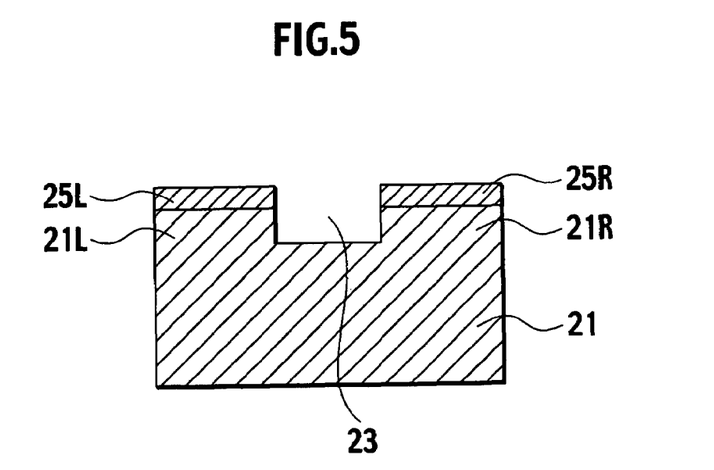
FIG. 5 is an enlarged partial sectional view taken along III-III in FIG. 3.
Figure 6:
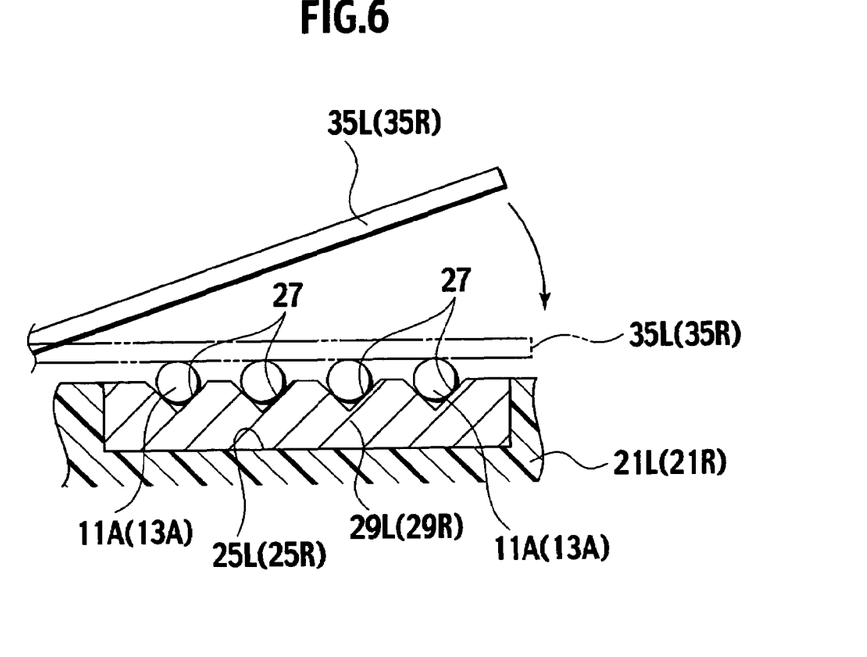
FIG. 6 is an enlarged view as viewed from the arrow IV.
Figure 7:
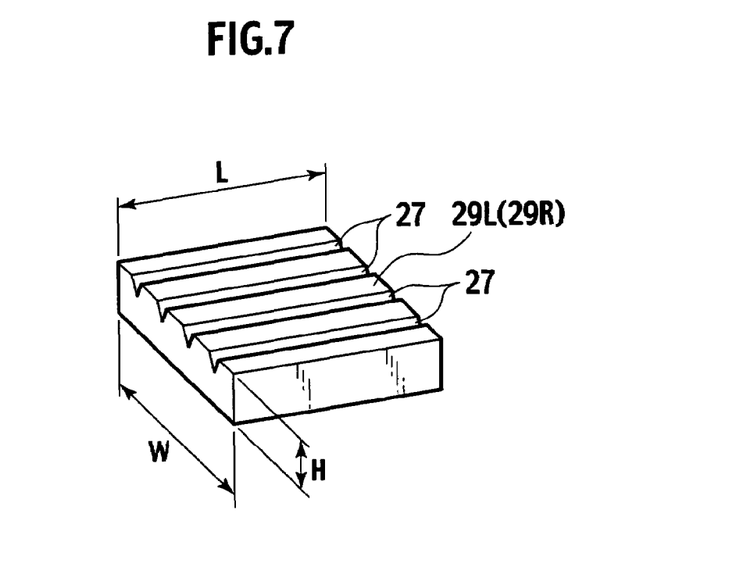
FIG. 7 is a perspective view of a brittle lower clamp block in FIG. 6.

The fusion splicing system 1 includes a loading device 19 inside the first and second fiber holders 5 and 7 on the body frame 3. The loading device 19 includes a loading body frame 21 or a loading stage of, for example, a resin on the body frame 3. The loading body frame 21, additionally with respect to FIG. 5, is formed with a recess 23 at the substantially central portion as viewed from front. The loading body frame 21 includes left and right rising portions 21L and 21R on both sides of the recess 23. The rising portions 21L and 21R are arranged opposite to each other relative to the recess 23. The portions of the rising portions 21L and 21R have upward open openings 25L and 25R as viewed from side. The loading body frame 21, as illustrated in FIGS. 6 and 7, includes, within the openings 25L and 25R, lower clamp blocks 29L and 29R with surfaces having V-grooves 27 as grooves. The lower clamp blocks 29L and 29R are made of, for example, ceramics as a brittle material. The brittle material may employ a glass material as ceramics. In this embodiment, four V-grooves 27 extend in a longitudinal direction L1, allowing for clamp of the optical fibers 11A and 13A exposed by removing the sheaths of the optical fiber ribbon cords 11 and 13.

Figure 8:
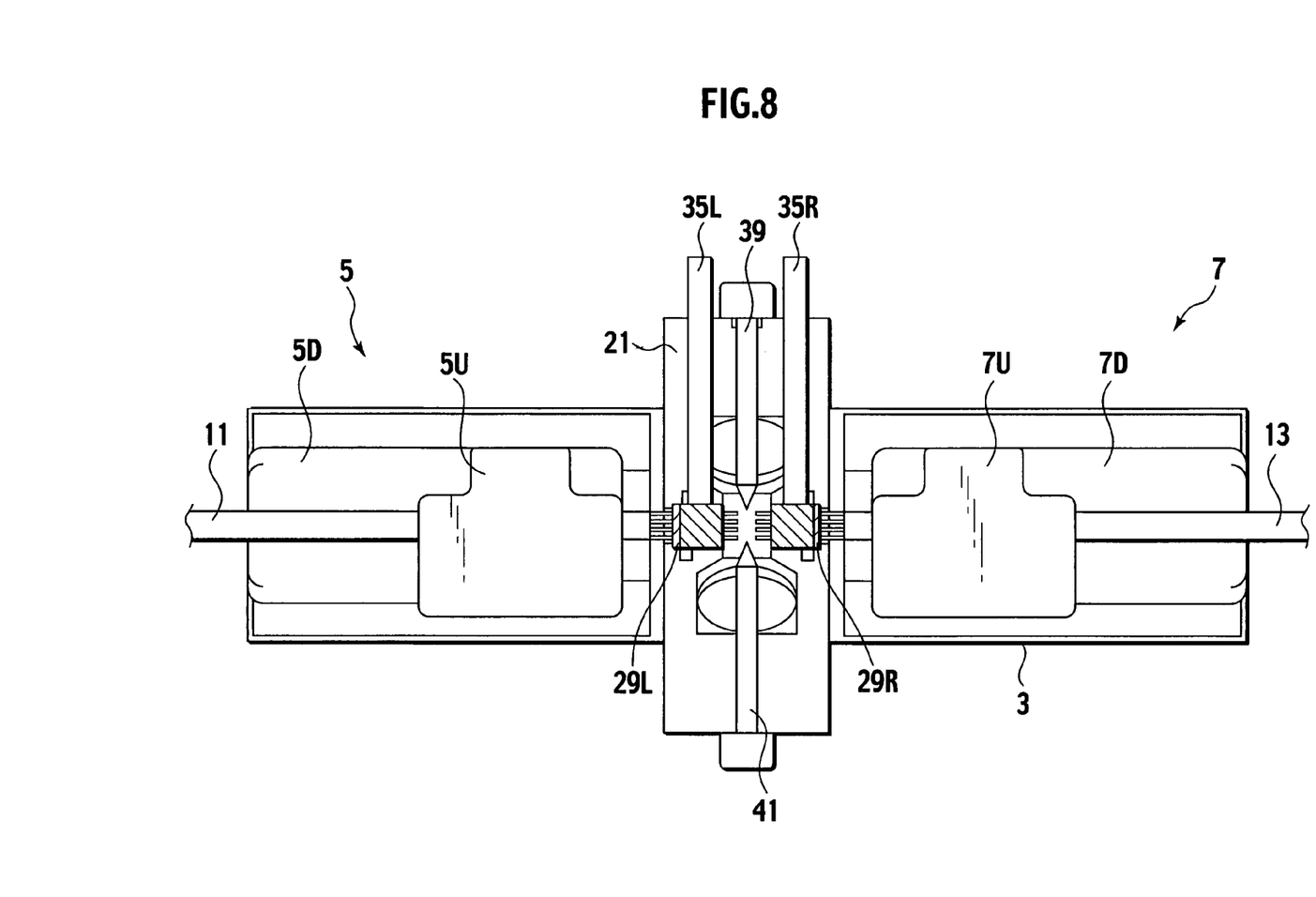
FIG. 8 is a plane view of the primary portion of the fusion splicer in FIG. 3, where a clamp member is added.

Referring to FIG. 3, the loading body frame 21 has, at the front and rear of the recess 23 in a transverse direction T1, holes 31 and 33 communicating with the recess 23. The recess 23 and openings 25L and 25R communicate with each other. As illustrated in FIG. 6 and 8, the loading device 19 includes upper clamps 35L and 35R vertically movable relative to the lower clamp blocks 29L and 29R of ceramics.

In FIG. 3, the fusion splicing system 1 includes, for example, discharge electrodes 39 and 41 as fusion splicing means 37 arranged in the transverse direction T1, with the recess 23 between the lower clamp blocks 29L and 29R interposed therebetween. The discharge electrodes 39 and 41 have respective ends opposed to each other in the recess 23. The holes 31 and 33 have at the lower portions, check holes 43 and 45 to which, for example, a CCD camera is mounted for checking contact state and fusion splice state between the optical fibers 11A and 13A. The loading body frame 21 has, on both sides of the lower clamp blocks 29L and 29R in the transverse direction T1, positioning holes 47 for use of positioning pins during insert molding.

The very small lower clamp block 29L and 29R, as illustrated in FIG. 7, have, for example, a square section with a length L of 8 mm, a width W of 8 mm, and height H of 2 mm.

Figure 9:
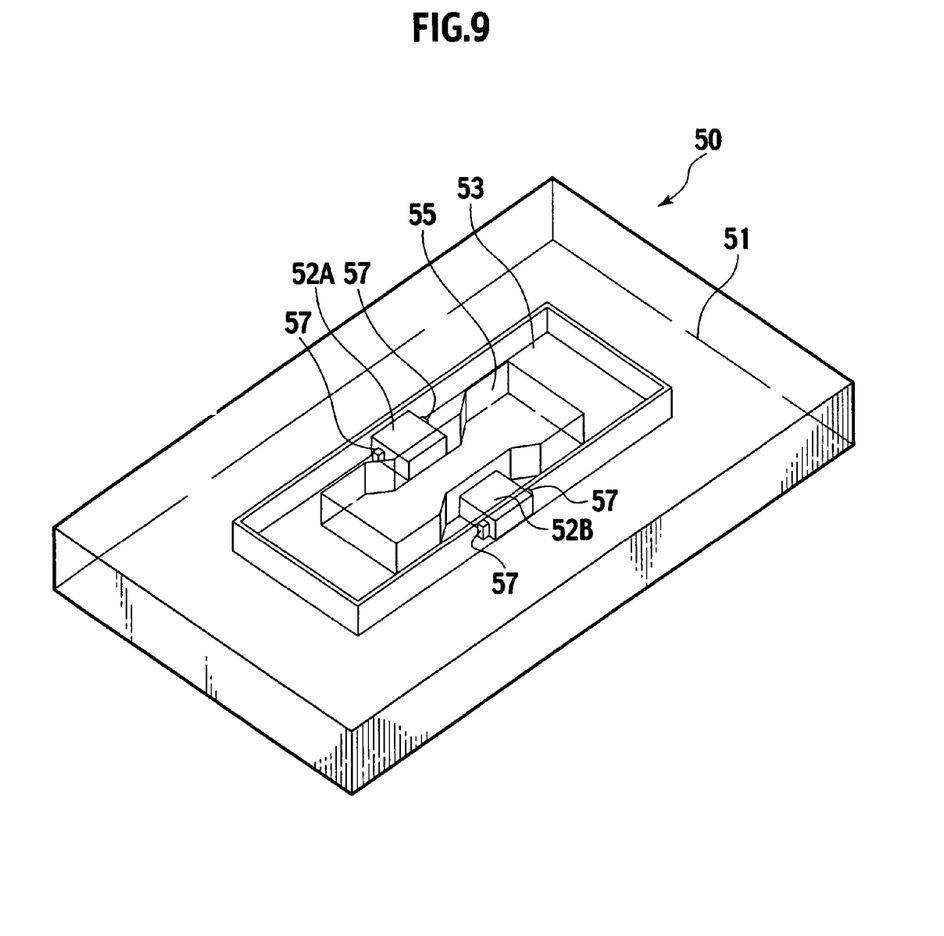
FIG. 9 is a perspective view illustrating a mold for insert molding of the body frame in FIG. 3.

Next, a method of fabricating the resinous loading body frame 21 will be described. As illustrated in FIG. 9, a mold 50 includes base 51; and a recess 53 at the central portion of the base 51. The mold 50 includes a block 55 projecting from the bottom of the recess 53. The mold 50 includes two pair of pins 57 positioned on both sides of the block 55 and projecting from the bottom of the recess.

Ceramic blocks 52A and 52B as the lower clamp blocks 29L, 29R are fitted in the mold 50 to be positioned using the positioning pins 57. A resin material for the loading body frame 21 is melted to pour into the recess 53 of the mold 50 for insert molding. The resin material is set around the ceramic blocks 52A and 52B, forming the loading body frame 21 having the lower clamp block 29L and 29R in the opening 25L, 25R. The block 55 is formed into the recess 23 and holes 31 and 33. This process allows for easier and cheaper fabrication, thus achieving lower costs lower than related processes.

For clamping the optical fibers 11A an 13A of the optical fiber ribbon cords 11 and 13, the appropriate number of V-grooves 27 is formed after insert molding, which further enhances machining precision of the V-grooves comparing to conventional one. For clamping the optical fibers 11A and 13A of the optical fiber ribbon cords 11 and 13, the V-grooves 27 may be pre-formed before insert molding.

Next, a method of operating the optical fiber fusion splicer 100 will be described.

In FIG. 3, the sheaths of the ends of two optical fiber ribbon cords 11 and 13 are removed to expose the bare optical fibers 11A and 13A. The optical fiber ribbon cords 11 and 13 are placed in the grooves 15 and 17 formed to the first and second fiber holders 5D and 7D of the first and second fiber holders 5 and 7. When the first and second upper fiber holders 5U and 7U are rotated to move down to the first and second lower fiber holders 5D and 7D, the first and second upper fiber holders 5U and 7U and the first and second lower fiber holders 5D and 7D hold the optical fiber ribbon cords 11 and 13 therebetween, respectively. At this time, respective bare optical fibers 11A and 13A of the optical fiber ribbon cords 11 and 13 are placed in the grooves 27 formed to the lower clamp blocks 29L and 29R.

In this state, when the upper clamp 35L and 35R are moved down as illustrated in FIG. 8, the lower clamp blocks 29L and 29R and the upper clamps 35L and 35R clamp the optical fibers 11A and 13A therebetween, respectively. In addition, for example, the first fiber holder 5 are moved rightward, and the second fiber holder 7 are moved leftward in the longitudinal direction L1 of FIG. 3 to position the end faces of the bare optical fibers 11A and 13A at the contact position.

In this state, arc discharge is performed between the discharge electrodes 39 and 41. The arc discharge fuses the end faces of the bare optical fibers 11A and 13A to be fusion spliced to each other.

Thus, the lower clamp blocks 29L and 29R of a brittle material and with V-grooves 27 are not adhered to the loading body frame 21 by conventional adhesive. This structure does not need the step of adhering the lower clamp blocks 29L and 29R of a brittle material and with the V-grooves 27, reducing production costs. This structure eliminates peeling or separating of the lower clamp blocks 29L and 29R from the loading body frame 21 by poor adhesion, thus achieving necessary precision.

This structure allows for the lower clamp blocks 29L and 29R of a brittle material and with the V-grooves 27 smaller in size than conventional one and achieves remarkable reduction in costs. In addition, this structure simplifies machining of the lower clamp blocks 29L and 29R of a brittle material and with the V-grooves 27, thus reducing production costs.

The invention is not limited to the above-described embodiment, and may be carried out with appropriately modified another embodiment. In the above-described embodiment, the optical fiber ribbon cords with four optical fibers are illustrated as an example. While, an optical fiber ribbon cord with a single optical fiber or another multiple optical fibers may be employed. As means for providing the lower clamp blocks 29L and 29R to the openings 25L and 25R, means such as press-fitting other than insert molding may be handled.

Although the invention has been described above by reference to exemplary embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An optical fiber loading device comprising:
   a loading stage, comprising:
      a first clamp block, fitted in a first opening defined in a first base portion, comprising first grooves adapted to position first optical fibers of a first optical fiber cable;
      a first clamp arranged to releasably contact the first clamp block to clamp the first optical fibers therebetween, wherein the first clamp block and first base portion are formed of two different materials;
      a second clamp block, fitted in a second opening defined in a second base portion formed of a material different from a material used to form the second clamp block, the second clamp block having second grooves adapted to position second optical fibers of a second optical fiber cable so that the second optical fibers are aligned respectively with the first optical fibers positioned in the first grooves; and
      a second clamp arranged to releaseably contact the second clamp block to clamp the second optical fibers therebetween; and
   a first holder adapted to hold the first optical fiber cable, and to move relative to the loading stage;
   wherein at least one of the first and the second optical fibers allows the first optical fibers and the second optical fibers respectively to meet each other; and
   wherein a single member comprises both a portion of the first clamp block and a portion of the second clamp block.

2. The optical fiber loading device according to claim 1, wherein the first clamp block is formed of a ceramic material.

3. The optical fiber loading device according to claim 1, wherein the first clamp block is formed of a material more brittle that the material of which the first base portion is formed.

4. The optical fiber loading device according to claim 1, wherein the first base portion is formed of a resinous material.

5. A method of insert molding a loading stage for an optical fiber comprising:
   fitting a first clamp block and a second clamp block to a mold;
   filling a resin into the mold having the first clamp block and the second clamp block fitted thereto to form a base portion around the first clamp block and the second clamp block; and
   forming first grooves in the first clamp block and second grooves in the second clamp block so that any one of the first grooves is aligned to a corresponding one of the second clamp block after the first clamp block is insert molded to the base portion;
   wherein a single member comprises both a portion of the first clamp block and portion of the second clamp block.

6. An optical fiber fission splicer comprising:
   a loading stage, comprising: a first clamp block, fitted in a first opening defined in a first base portion, comprising first grooves adapted to position first optical fibers of a first optical fiber cable; and a first arranged to releasably contact the first clamp block to clamp the first optical fibers therebetween;
   a first holder adapted to hold the first optical fiber cable and to move the first optical fiber cable relative to the loading stage to bring the first optical fibers in contact with second optical fibers of a second optical fiber cable; and
   a first electrode configured to discharge between the first and second optical fibers to fusion splice the first and second optical fibers to each other,
   wherein the loading stage further comprises: a second clamp block, fitted in a second opening defined in a second base portion, comprising second grooves adapted to position the second optical fibers of the second optical fiber cable;
   wherein a single member comprises both a portion of the first clamp block and a portion of the second clamp.

7. The optical fiber fusion splicer according to claim 6, wherein the loading stage further comprises: a second clamp arranged to releaseably contact the second clamp block to clamp the second optical fibers therebetween, wherein the second clamp block and second base portion are formed of two different materials.

8. The optical fiber fusion splicer according to claim 6, wherein the first clamp block is formed of a material more brittle that the material of which the first base portion is formed.

9. The optical fiber fusion splicer according to claim 6, wherein the first base portion is formed of a resinous material.

10. The optical fiber fission splicer according to claim 6, wherein the first clamp block is formed of a ceramic material.

* * * * *